_(12)_ United States Patent
Aaltonen et al.

(10) Patent No.: US 9,304,538 B2
(45) Date of Patent: Apr. 5, 2016

(54) DISPLAY APPARATUS AND ASSOCIATED METHOD

(71) Applicant: Nokia Technologies Oy, Espoo (FI)

(72) Inventors: Antero Heikki Hemminki Aaltonen, Salo (FI); Jorma Mikael Ikonen, Vartsala (FI)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 13/713,785

(22) Filed: Dec. 13, 2012

(65) Prior Publication Data

US 2014/0168090 A1    Jun. 19, 2014

(51) Int. Cl.
*G06F 1/16* (2006.01)
*G06F 3/041* (2006.01)
*G02F 1/1333* (2006.01)
*H01L 51/52* (2006.01)

(52) U.S. Cl.
CPC .............. *G06F 1/1601* (2013.01); *G06F 3/041* (2013.01); *G02F 1/13338* (2013.01); *G02F 1/133308* (2013.01); *G06F 2200/1634* (2013.01); *H01L 51/5237* (2013.01); *Y10T 156/10* (2015.01); *Y10T 428/239* (2015.01)

(58) Field of Classification Search
CPC .................................................. H01L 51/5237
USPC ........................................................ 313/511
See application file for complete search history.

(56) References Cited

U.S. PATENT DOCUMENTS

| 6,437,846 | B1 | 8/2002 | Ono et al. | |
|---|---|---|---|---|
| 8,907,231 | B2 | 12/2014 | Calvo Alonso | |
| 9,120,187 | B2 | 9/2015 | Maatta et al. | |
| 2003/0071941 | A1 | 4/2003 | Mizuno | |
| 2005/0117197 | A1* | 6/2005 | Ide | 359/291 |
| 2006/0146486 | A1 | 7/2006 | Wikstrom et al. | |
| 2009/0279241 | A1 | 11/2009 | Gettemy et al. | |
| 2009/0316062 | A1* | 12/2009 | Nishizawa | 349/58 |
| 2010/0103138 | A1 | 4/2010 | Huang et al. | |
| 2010/0182271 | A1 | 7/2010 | Krier | |
| 2011/0234079 | A1 | 9/2011 | Eom et al. | |
| 2012/0274575 | A1 | 11/2012 | Solomon et al. | |
| 2013/0002133 | A1* | 1/2013 | Jin et al. | 313/511 |
| 2013/0330495 | A1 | 12/2013 | Maatta et al. | |
| 2014/0022747 | A1 | 1/2014 | Calvo Alonso | |

FOREIGN PATENT DOCUMENTS

EP    2 177 968 A1    4/2010
WO    WO 2010/058829 A1    5/2010

OTHER PUBLICATIONS

International Search Report and Written Opinion for Application No. PCT/IB2013/060174 dated Jan. 29, 2014.

* cited by examiner

*Primary Examiner* — Wen-Ying P Chen
(74) *Attorney, Agent, or Firm* — Alston & Bird LLP

(57) ABSTRACT

An apparatus and a method are provided. The apparatus comprises: a display panel; a film extending across the display panel and beyond a periphery of the display panel; and a curved support configured to support the film outside the periphery of the display panel.

18 Claims, 9 Drawing Sheets

DISPLAY APPARATUS AND ASSOCIATED METHOD

TECHNOLOGICAL FIELD

Embodiments of the present invention relate to a display apparatus. In particular, they relate to supporting an extended touch film in a display apparatus.

BACKGROUND

Portable electronic devices such as mobile telephones often comprise a display apparatus. The display apparatus may include a display panel with an overlying display window.

BRIEF SUMMARY

According to various, but not necessarily all, embodiments of the invention there is provided an apparatus, comprising: a display panel; a film extending across the display panel and beyond a periphery of the display panel; and a curved support configured to support the film outside the periphery of the display panel.

According to various, but not necessarily all, embodiments of the invention there is provided a method, comprising: causing a film to extend across a display panel and beyond a periphery of the display panel; and providing a curved support to support the film outside the periphery of the display panel.

BRIEF DESCRIPTION

For a better understanding of various examples that are useful for understanding the brief description, reference will now be made by way of example only to the accompanying drawings in which.

DETAILED DESCRIPTION

Embodiments of the invention relate to the arrangement of a film 10 (such as a film configured to sense touch, or a polarizer) within a display apparatus 101/102/103.

In this regard, the Figures illustrate an apparatus 101/102/103, comprising: a display panel 20; a film 10 extending across the display panel 20 and beyond a periphery 29 of the display panel 20; and a curved support 30 configured to support the film outside the periphery 29 of the display panel 20.

Figure 1:
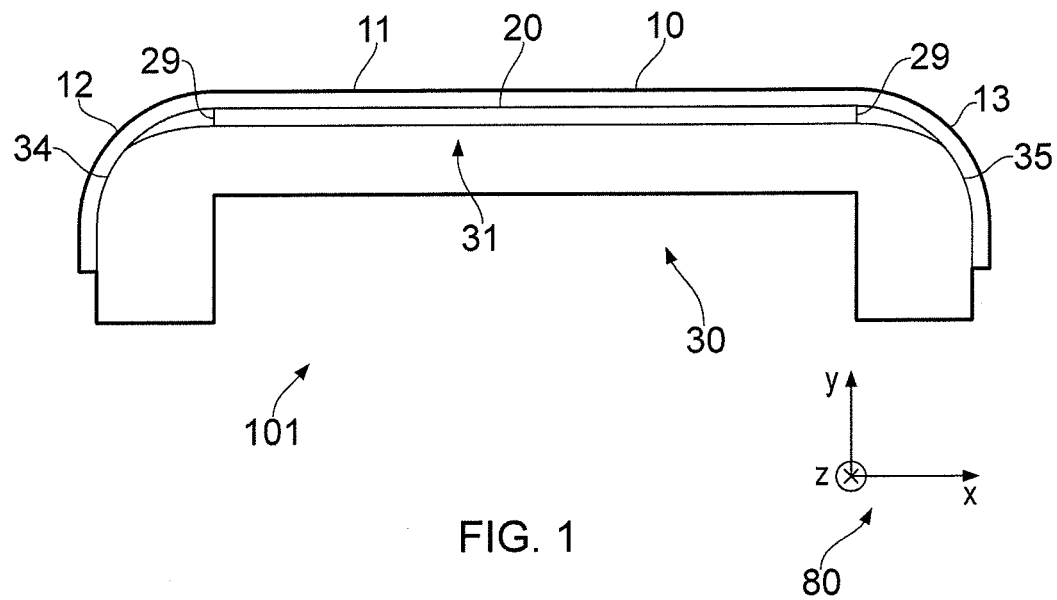
FIG. 1 illustrates a cross-sectional view of a first example of a display apparatus.

FIG. 1 illustrates a first example 101 of a display apparatus. The display apparatus 101 illustrated in FIG. 1 comprises a film 10, a display panel 20 and a curved support 30. Cartesian co-ordinates 80 are illustrated in FIG. 1 and the other figures to help the reader orient one figure relative to another.

The display panel 20 may be any type of display panel, including: a liquid crystal display panel, an organic light emitting diode display panel or a quantum dot display panel. The illustrated display panel 20 has a length substantially aligned with the z-axis in FIG. 1, a width substantially aligned with the x-axis and a depth substantially aligned with the y-axis. In this example, the display panel 20 has a periphery 29 and is substantially flat.

In some examples, the film 10 may be configured to sense touch. For instance, the film 10 may comprise a plurality of touch sensors that are distributed across the film 10. Alternatively, in other examples, the film 10 might instead be a polarizer.

The film 10 has a length that is substantially aligned with the z-axis in FIG. 1, a width substantially aligned with the x-axis and a depth substantially aligned with the y-axis. FIG. 1 illustrates the film 10 extending across the display panel 20 and beyond the periphery 29 of the display panel 20.

FIG. 1 illustrates the display panel 20 positioned between the film 10 and the support 30. The illustrated support 30 includes a first portion/surface 31 that is configured to support the display panel 20 and a first portion 11 of the film 10. The display panel 20 may be substantially flat and, if so, the first portion/surface 31 which supports the display panel 20 is also substantially flat, as shown in FIG. 1.

The curved support 30 illustrated in FIG. 1 also includes second and third portions/surfaces 34, 35 which support second and third portions 12, 13 of the film 10 respectively that are positioned outside the periphery 29 of the display panel 20. The second and third portions 12, 13 of the film 10 may be attached to the second and third portions/surfaces 34, 35 of the support 30 using, for instance, an adhesive.

The film 10 may have a particular minimum bend radius, where if the film 10 is bent at a radius below the minimum bend radius the film 10 will be damaged (for instance, it may kink or break). The film 10 may, for example, be relatively brittle. The curved portions/surfaces 34, 35 of the support 30 may advantageously have a curvature that prevents the film 10 from being bent at a radius below the minimum bend radius, thus preventing the film 10 from being damaged.

Figure 2:
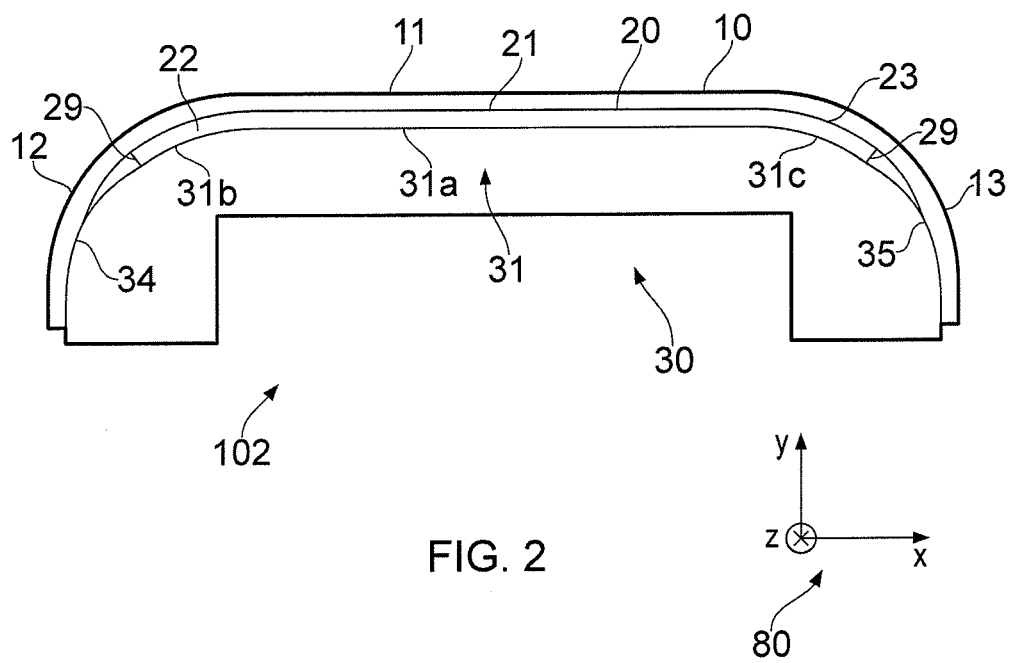
FIG. 2 illustrates a cross-sectional view of a second example of the display apparatus.

A second example 102 of the display apparatus is illustrated in FIG. 2. The display apparatus 102 illustrated in FIG. 2 differs from that illustrated in FIG. 1 in that the display panel 20 includes some curved portions 22, 23. In this example, the first portion/surface 31 that supports the display panel 20 includes a substantially flat region 31a and some curved regions 31b, 31c. The substantially flat region 31a of the first portion/surface 31 supports a substantially flat portion 21 of the display panel 20. The curved regions 31b, 31c of the first portion/surface 31 support the curved portions 22, 23 of the display panel 20.

The curved surfaces 31b, 31c, 34, 35 of the support 30 may advantageously have a curvature that prevents the film 10 from being bent at a radius below its minimum bend radius, thus preventing the film 10 from being damaged.

Figure 3:
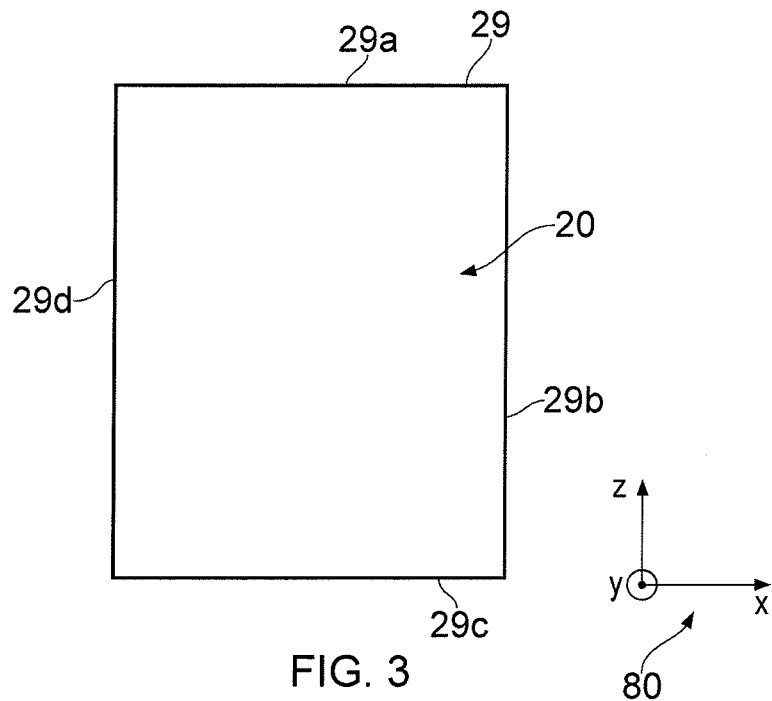
FIG. 3 is a plan view of a display panel.

FIG. 3 illustrates a plan view of a display panel 20, which may be substantially flat or curved. The periphery of the display panel 20 is again denoted by the reference numeral 29. In the illustrated example, the periphery 29 of the display panel 20 comprises four orthogonal edges 29a, 29b, 29c, 29d.

Figure 4:
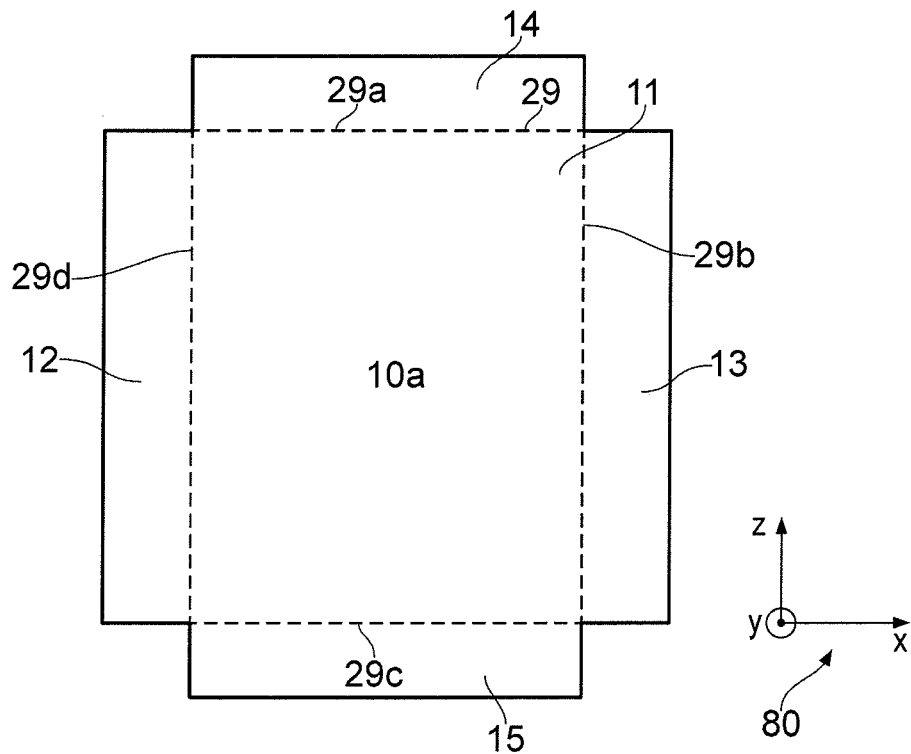
FIG. 4 is a plan view of a first example of a touch film.

FIG. 4 illustrates a first example 10a of the film 10 that overlies the display panel 20. The periphery of the display panel 20 beneath the film 10a is indicated by a dotted line 29. The first portion 11 of the film 10a illustrated in FIG. 4 is that which overlies the display panel 20. The film 10 includes second and third portions 12, 13 which extend over opposing edges 29d, 29b of the display panel 20 and outside the periphery 29 of the display panel 20 (as illustrated in FIG. 1 and FIG. 2). In this example the film 10a also includes fourth and fifth portions 14, 15 extend which over the other two edges 29a, 29c of the display panel 20 (which also oppose each another) and outside the periphery 29 of the display panel 20.

If the film 10a is a touch sensitive film, some or all of the portions 11-15 are configured to sense touch. For example, the first portion 11 may include touch sensors to enable the display apparatus 101/102/103 to operate as a touch sensitive display. Some or all of the second, third, fourth and fifth portions 12-15 may include touch sensors. In some instances, one or more of the second, third, fourth and fifth portions 11-15 may include an antenna and/or provide a base for a mechanical key.

In the event that the film 10 includes fourth and fifth portions 14 and 15 as illustrated in FIG. 4, the support 30 may comprise further curved portions/surfaces (not shown) to support those portions 14, 15 of the film 10.

Figure 5:
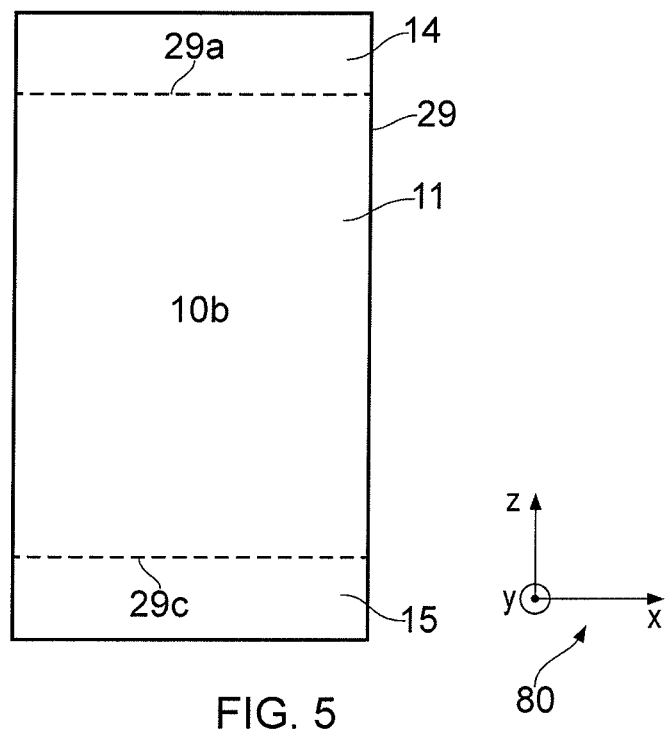
FIG. 5 is a plan view of a second example of the touch film.
Figure 6:
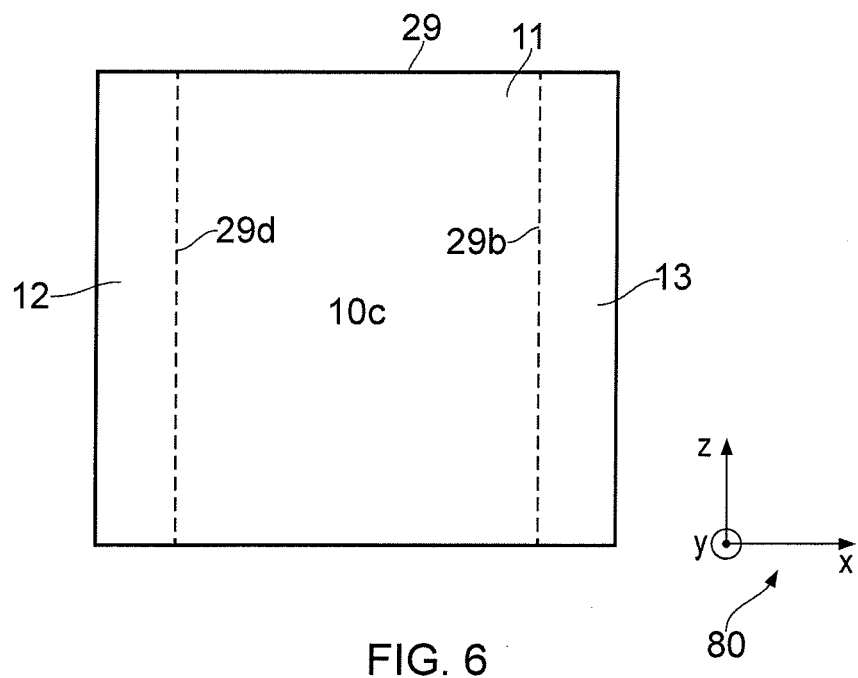
FIG. 6 is a plan view of a third example of the touch film.

In some examples, the film 10 might not comprise one or more of the second, third, fourth and fifth portions 12-15. FIG. 5 illustrates an example 10b in which the film 10 comprises the fourth and fifth portions 14, 15 but not the second and third portions 12, 13. FIG. 6 illustrates an example 10c in which the film 10 comprises the second and third portions 12, 13 but not the fourth and fifth portions 14, 15.

Figure 7:
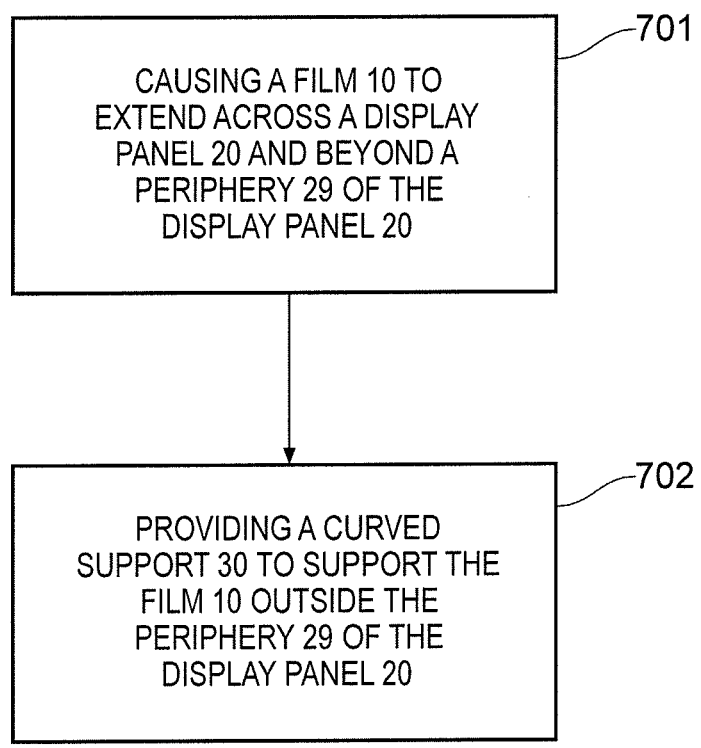
FIG. 7 is a flow diagram of a method.

FIG. 7 illustrates a flow chart of a method of manufacture. Block 701 in FIG. 7 involves causing a film 10 to extend across a display panel 20 and beyond a periphery 29 of the display panel 20. A display window may have been laminated with some of the film 10 prior to causing the film 10 to extend across the display panel 20 and beyond the periphery 29 of the display panel 20. If so, in this example, the portion(s) of the film 10 which extend beyond the periphery 29 of the display panel 20 are not be adhered to the display window 40.

Block 702 in FIG. 7 involves providing a curved support 30 to support the film 10 outside the periphery 29 of the display panel 20. One or more portions 12-15 of the film 10 that extend beyond the periphery 29 of the display panel 20 may then be attached to one or more curved portions 34, 35 of the curved support 30.

Figure 8:
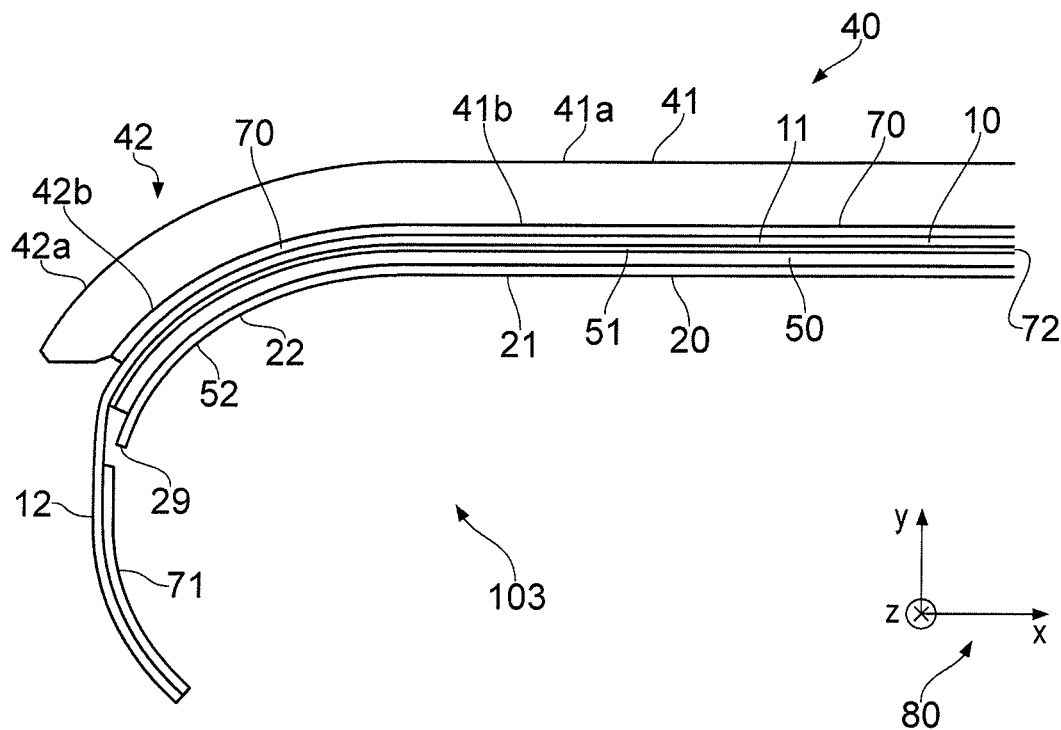
FIG. 8 is a cross-section of a third example of the display apparatus after a first stage of manufacture.
Figure 9:
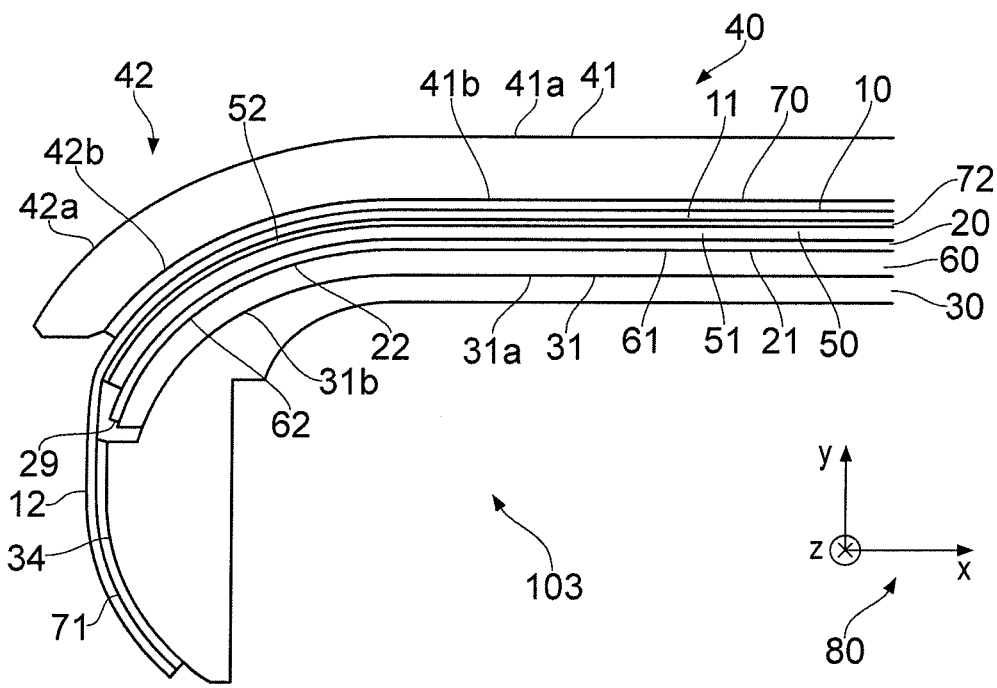
FIG. 9 is a cross-section of the third example of the display apparatus after a second stage of manufacture.
Figure 10:
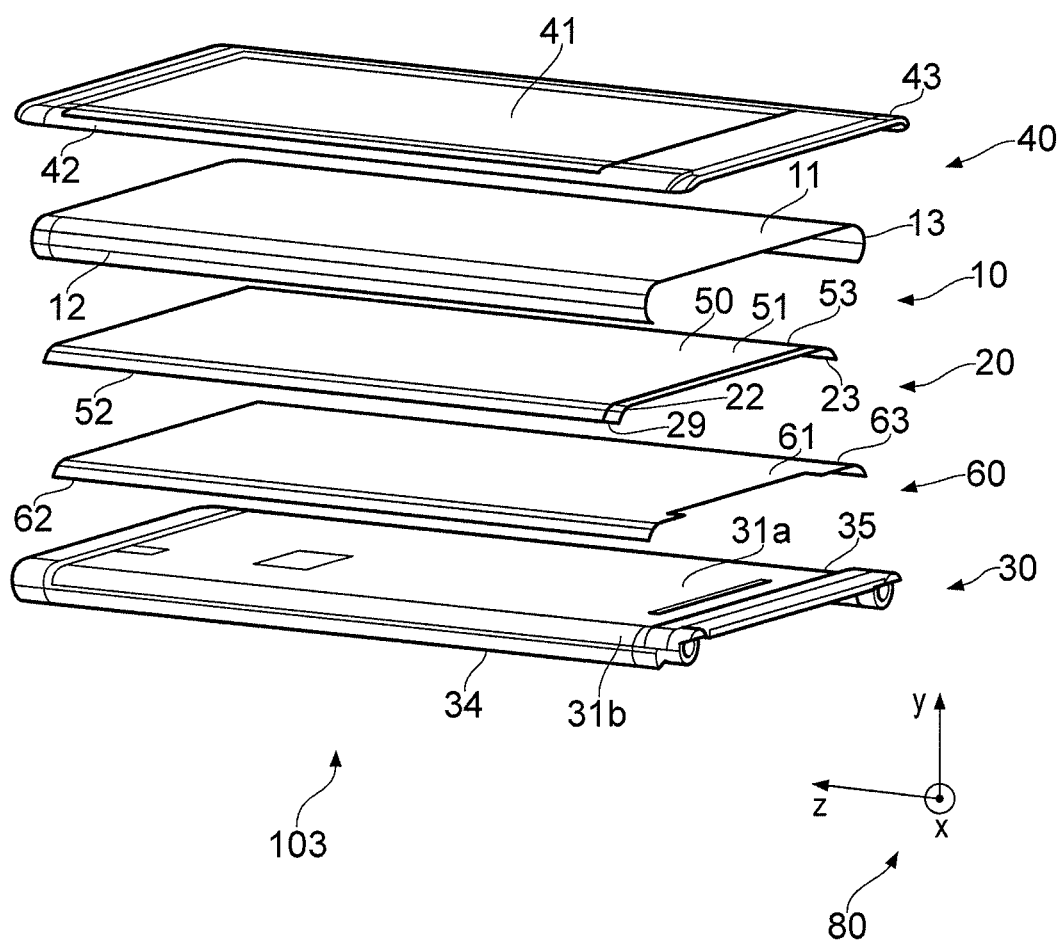
FIG. 10 is an exploded view of the third example of the display apparatus.
Figure 11:
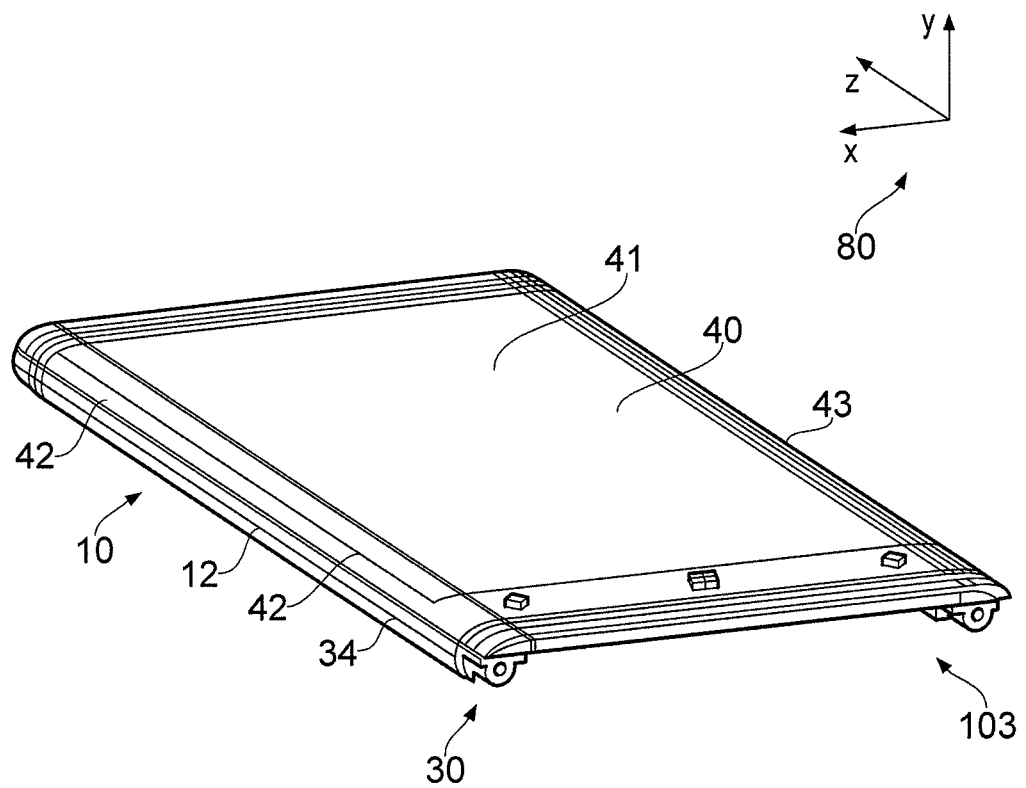
FIG. 11 is a perspective view of the third example of the display apparatus after the second stage of manufacture.

The manufacture of a third example 103 of the display apparatus will now be described with reference to FIGS. 8 to 11. Only one half of the cross-section of the display apparatus 103 is shown in FIGS. 8 and 9 but, as can be seen in FIGS. 10 and 11, the other half of the display apparatus 103 is a mirror image of the illustrated half.

In this example, a display window 40 is provided which has substantially flat portion 41 and one or more curved portions 42, 43. One curved portion 42 is illustrated in FIG. 8. The thickness of the substantially flat portion 41 of the display window 40 may be substantially constant its length and width. In the FIG. 8 illustration, the thickness of the substantially flat portion 41 is substantially constant because the distance between an outer surface 41a and an inner surface/ underside 41b of the substantially flat portion 41 is substantially constant across its width (which is aligned with the x-axis in FIG. 8).

The thickness of the curved portion 42 of the display window 40 may also be substantially constant across its length and width. In the FIG. 8 illustration, the thickness of the curved portion 42 is substantially constant because the distance between the outer surface 42a and the inner surface/ underside 42b of the curved portion 42 is substantially constant across its width (which is aligned with the x-axis in FIG. 8).

The inner surface 41b, 42b of the display window 40 is laminated with the film 10 using an adhesive 70, such that an upper surface of the portion 11 of the film 10 that is adhered to the inner surface 41b of the substantially flat portion 41 of the window 40 is also substantially flat, and the portion of the film 10 that is adhered to the inner surface 42b of the curved portion 42 of the window 40 has the same curvature as the inner surface 42b.

A polarizer 50 is then attached to a lower surface of the film 10 (for example, using an adhesive) and a curved display panel 20 is positioned beneath the polarizer 50. A first portion 51 of the polarizer 50 and a first portion of the display panel 20 are substantially flat and aligned with the substantially flat portion 41 of the display window 40. A second, curved, portion 52 of the polarizer and a second, curved, portion 22 of the display panel 20 are positioned beneath the curved portion 42 of the window 40 and have the same curvature as the curved portion 42 of the display window 40 in this example. It can be seen from FIG. 8 that there are no air gaps between the display window 40, the film 10, the polarizer 50 and the display panel 20.

FIG. 8 illustrates a second portion 12 of the film 10, which is not attached to the display window 40, extending beyond the periphery 29 of the display panel 20, the periphery of the display window 40 and the periphery of the polarizer 50.

As illustrated in FIG. 9, a curved cushion 60 is then positioned beneath the display panel 20 and a curved support 30 is positioned beneath the cushion 60. The cushion 60 is configured to cushion the display panel 20 and may, for example, be made from Poron®.

A first (substantially flat) portion 61 of the cushion 60 is positioned beneath the substantially flat portion 21 of the display panel 20. A second, curved, portion 62 of the cushion 60 is positioned beneath the curved portion 22 of the display panel 20.

The curvature of second portion 62 of the cushion 60 is substantially the same as that of the curved portion 22 of the display panel 20. There are no air gaps between the display panel 20 and the cushion 60 in the illustrated example.

The curved support 30 comprises a first portion/surface 31 which is positioned beneath the cushion 60 and supports the cushion 60, the display panel 20, the polarizer 50, some of the film 10 and the display window 40. The first portion/surface 31 has a substantially flat region 31a which supports the substantially flat first portions 61, 21, 51, 11, 41 of the cushion 60, the display panel 20, the polarizer 50, the film 10 and the window 40. In the illustrated example, there is no air gap between the substantially flat first region 31a of the support 30 and the first portion 61 of the cushion 60.

A curved region 31b of first portion/surface 31 of the curved support 30 supports the curved portions 62, 22, 52, 42 of the cushion 60, the display panel 20, the polarizer 50 and the window 40, and also a curved portion of the film 10. In the illustrated example, there is no air gap between the curved region 31b of the support 30 and the curved portion 62 of the cushion 60.

The support 30 further comprises a second, curved, portion 34 that is configured to support the second portion 12 of the film 10 which extends beyond the periphery of the cushion 60, the display panel 20, the polarizer 50 and the display window 40. In this example, the second portion 12 of the film 10 is attached to the second, curved, portion 34 of the support 30 using an adhesive 71.

FIG. 10 illustrates an exploded view of the third example of the display apparatus 103. The symmetric form of the display window 40, the film 10, the polarizer 50, the display panel 20, the cushion 60 and the support 30 can be seen in FIG. 10. In this regard, FIG. 10 illustrates a third, curved, portion 43, 13, 53, 63, 35 for the window 40, the film 10, the polarizer 50, the display panel 20, the cushion 60 and the support 30 respectively, each of which mirrors the second, curved, portion 42, 12, 52, 62, 34 in each item 40, 10, 50, 20, 60, 30.

FIG. 11 illustrates a perspective view of the display apparatus 103 illustrated in FIG. 9.

Figure 12:
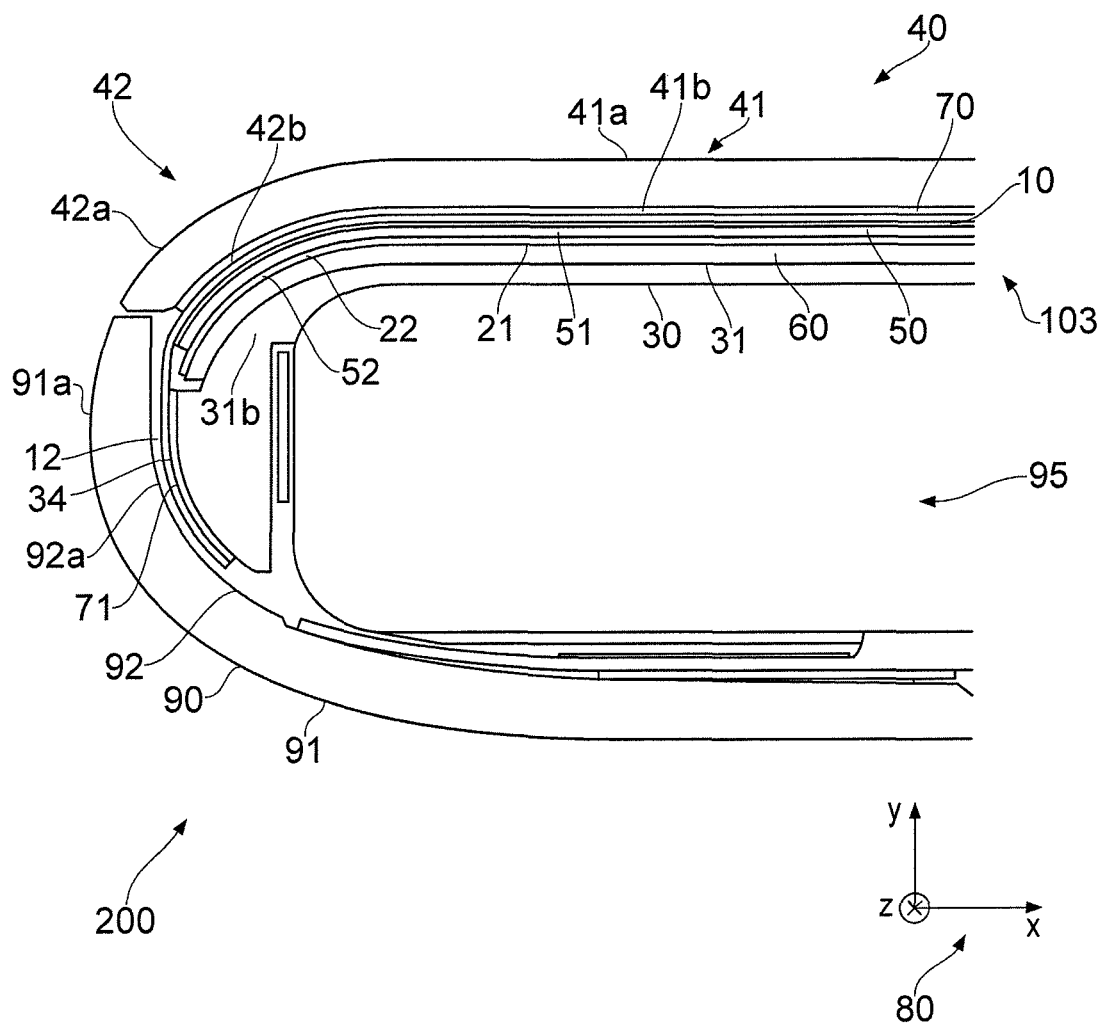
FIG. 12 is a cross-section of a portable electronic device which includes the third example of the display apparatus.

FIG. 12 illustrates a portable electronic device 200 that includes an external housing/cover 90 and an engine 95. The engine 95 may include electronic components of the device 200 such as one or more processors and one or more memories. The external housing 90 has an inner surface 92 and an outer surface 91. The inner surface 92 is separated from the outer surface 91 by the thickness of the housing 90.

The outer surfaces 41, 42, 43, 91 of the display window 40 and the external housing 90 define the outer shape/surface of the device 200. The film 10, the polarizer 50, the display panel 20, the cushion 60 and the support 30 are located within the outer surface of the device 200.

It can be seen from FIG. 12 that a portion 92a of the inner surface 92 of the housing 90 is positioned adjacent the second portion 12 of the film 10 and the second portion 34 of the support 30. It has the same curvature as the second portion 12 of the film 10 and the second portion 34 of the support 30 which are both positioned directly inside that portion 92a of the housing 90.

An outer surface portion 91a that corresponds with the inner surface portion 92a (that is, which is separated from the inner surface portion 92a by the thickness of the housing 90) may also have the same curvature.

The second film portion 12 (which is attached to the second, curved, portion 34 of the support 30) is configured to detect touch on the outer surface portion 91a of the external housing 90. The close proximity of the outer surface portion 91a to the second film portion 12 enables the second film portion 12 to reliably detect touch on the outer surface portion 91a. The outer surface portion 91a is rigid; it is not necessary for it to displace when touched in order for the second film portion 12 to detect touch.

Figure 13:
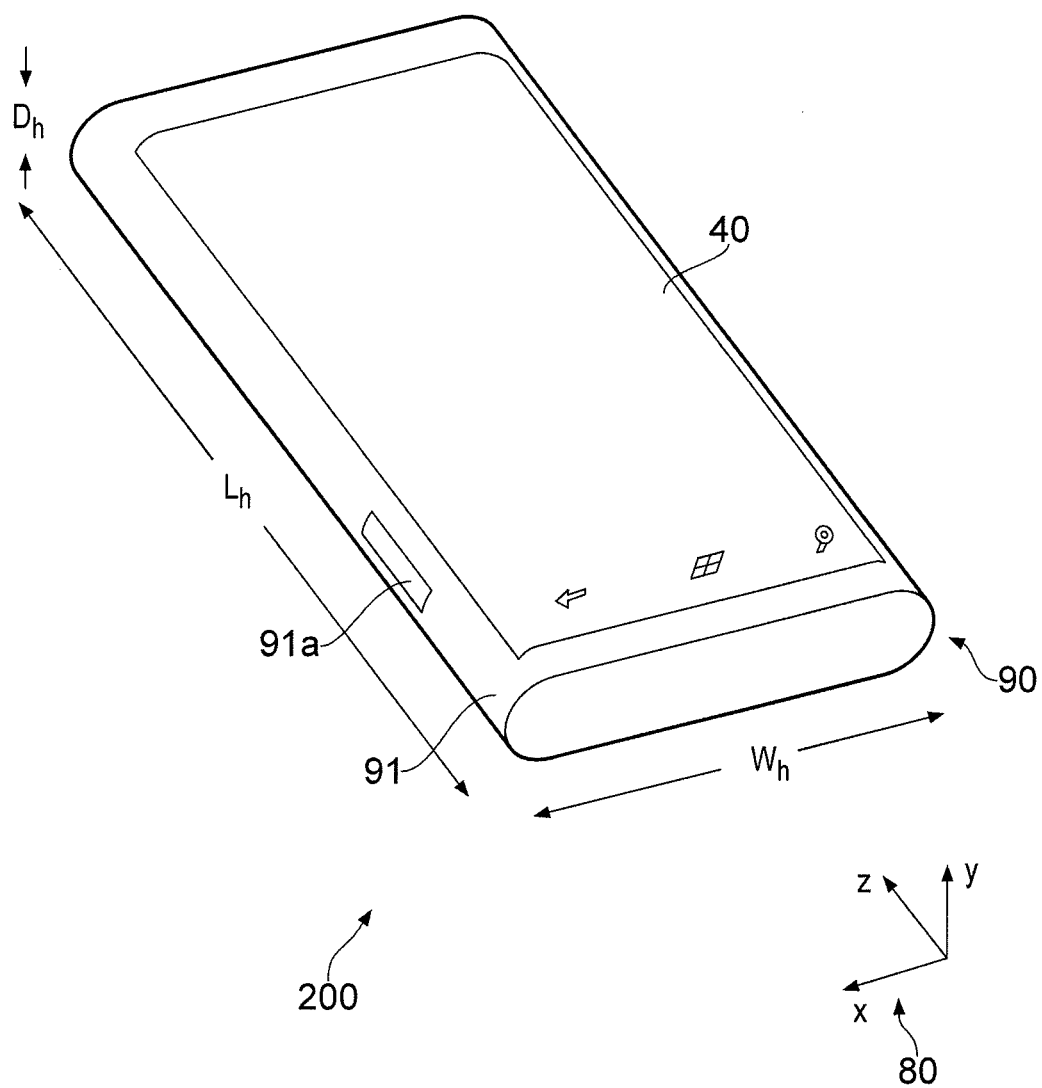
FIG. 13 is a perspective view of a portable electronic device comprising the first, second or third example of the display apparatus.

FIG. 13 illustrates a perspective view of the portable electronic device 200. The housing 90 of the device 200 (and therefore also the device 200 itself) has a length $L_h$, a width $W_h$ and a depth $D_h$. In the illustration, the length $L_h$ is aligned with the z-axis, the width $W_h$ is aligned with the x-axis and the depth $D_h$ is aligned with the y-axis. The length $L_h$ is greater than the width $W_h$, and the width $W_h$ is greater than the depth $D_h$.

The outer surface portion 91a on which the second film portion 12 detects touch is defined by the depth $D_h$ and the length $L_h$ of the external housing 90 in this example. The portion 91a may be demarcated as one or more touch sensitive keys on the housing 90, as illustrated in FIG. 13.

In summary, a method of manufacturing a display apparatus 101/102/103 has been described, in which the film 10 extends across a display panel 20 and beyond the periphery 29 of the display panel 20. Portions 12, 13 of the film 10 which extend beyond the periphery 29 of the display panel 20 may be configured to detect touch on a portion 91a of an outer surface 91 of an external housing 90.

Advantageously, in some embodiments, a curved support 30 is provided which has a curvature that prevents the film 10 from being bent at a radius below its minimum bend radius, thus preventing the film 10 from being damaged.

Embodiments of the invention may also advantageously provide a reliable touch sensing function on an outer surface portion 91a of an external housing 90, because a portion 12 of a touch sensitive film 10 is located close to an inner surface portion 92a of the housing 90 that corresponds with the outer surface portion 91a. This may be achieved by making the curvature of the inner surface portion 92a and the film portion 12 substantially the same.

Although embodiments of the present invention have been described in the preceding paragraphs with reference to various examples, it should be appreciated that modifications to the examples given can be made without departing from the scope of the invention as claimed. For example, although the touch sensitive outer portion 91a of the external housing 90 is described above as being part of a surface defined by the length $L_h$ and the depth $D_h$ of the housing 90, in other embodiments it may instead be part of a surface defined by the length $L_h$ and the width $W_h$ of the housing 90.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
 a display panel;
 a film, configured to sense touch, extending across the display panel and beyond a periphery of the display panel;
 a curved support configured to support the film outside the periphery of the display panel; and
 an external housing, wherein a portion of the film that extends beyond the periphery of the display panel is configured to detect touch on the external housing.

2. An apparatus as claimed in claim 1, wherein the curved support comprises a first portion that is configured to support the display panel, and a second, curved, portion that is configured to support the film outside the periphery of the display panel.

3. An apparatus as claimed in claim 2, wherein the film is attached to the second, curved, portion of the curved support.

4. An apparatus as claimed in claim 3, wherein the film is attached to the second, curved, portion of the curved support by an adhesive.

5. An apparatus as claimed in claim 2, wherein at least a portion of the display panel is substantially flat, and is supported by a substantially flat region of the first portion of the curved support.

6. An apparatus as claimed in claim 2, wherein at least a portion of the display panel is curved, and is supported by a curved region of the first portion of the curved support.

7. An apparatus as claimed in claim 6, further comprising a display window, wherein a portion of the display window is curved.

8. An apparatus as claimed in claim 7, wherein the portion of the display window has substantially the same curvature as a portion of the film.

9. An apparatus as claimed in claim 8, wherein an underside of the display window is laminated with the film.

10. An apparatus as claimed in claim 7, wherein the portion of the display window has substantially the same curvature as a portion of the display panel.

11. An apparatus as claimed in claim 1, wherein a portion of an inner surface of the external housing has substantially the same curvature as the portion of the film that extends beyond a periphery of the display panel and is configured to detect touch on the external housing.

12. An apparatus as claimed in claim 1, wherein the external housing has a length, a width and a depth, and the portion of the film is configured to detect touch on at least one of: a portion of a surface defined by the depth and the length, and a portion of a surface defined by the depth and the width.

13. An apparatus as claimed in claim 1, wherein an outer surface portion of the external housing on which the portion of the film is arranged to detect touch is demarcated as one or more touch sensitive keys, separate from the display panel.

14. A method, comprising:
causing a film, configured to sense touch, to extend across a display panel and beyond a periphery of the display panel;
providing a curved support to support the film outside the periphery of the display panel; and
providing an external housing, wherein a portion of the film that extends beyond the periphery of the display panel is configured to detect touch on the external housing.

15. A method as claimed in claim 14, further comprising: laminating a display window with the film prior to causing the film to extend across the display panel and beyond a periphery of the display panel.

16. A method as claimed in claim 14, wherein the curved support comprises a first portion that supports the display panel, and a second, curved, portion that supports the film outside the periphery of the display panel.

17. A method as claimed in claim 16, further comprising: attaching a portion of the film that extends beyond the periphery of the display panel to the second, curved, portion of the curved support.

18. A method as claimed in claim 14, wherein an outer surface portion of the external housing on which the portion of the film is arranged to detect touch is demarcated as one or more touch sensitive keys, separate from the display panel.

* * * * *